July 16, 1957  R. D. JORDAN  2,799,322
CHILD'S SAFETY SEAT
Filed July 5, 1955
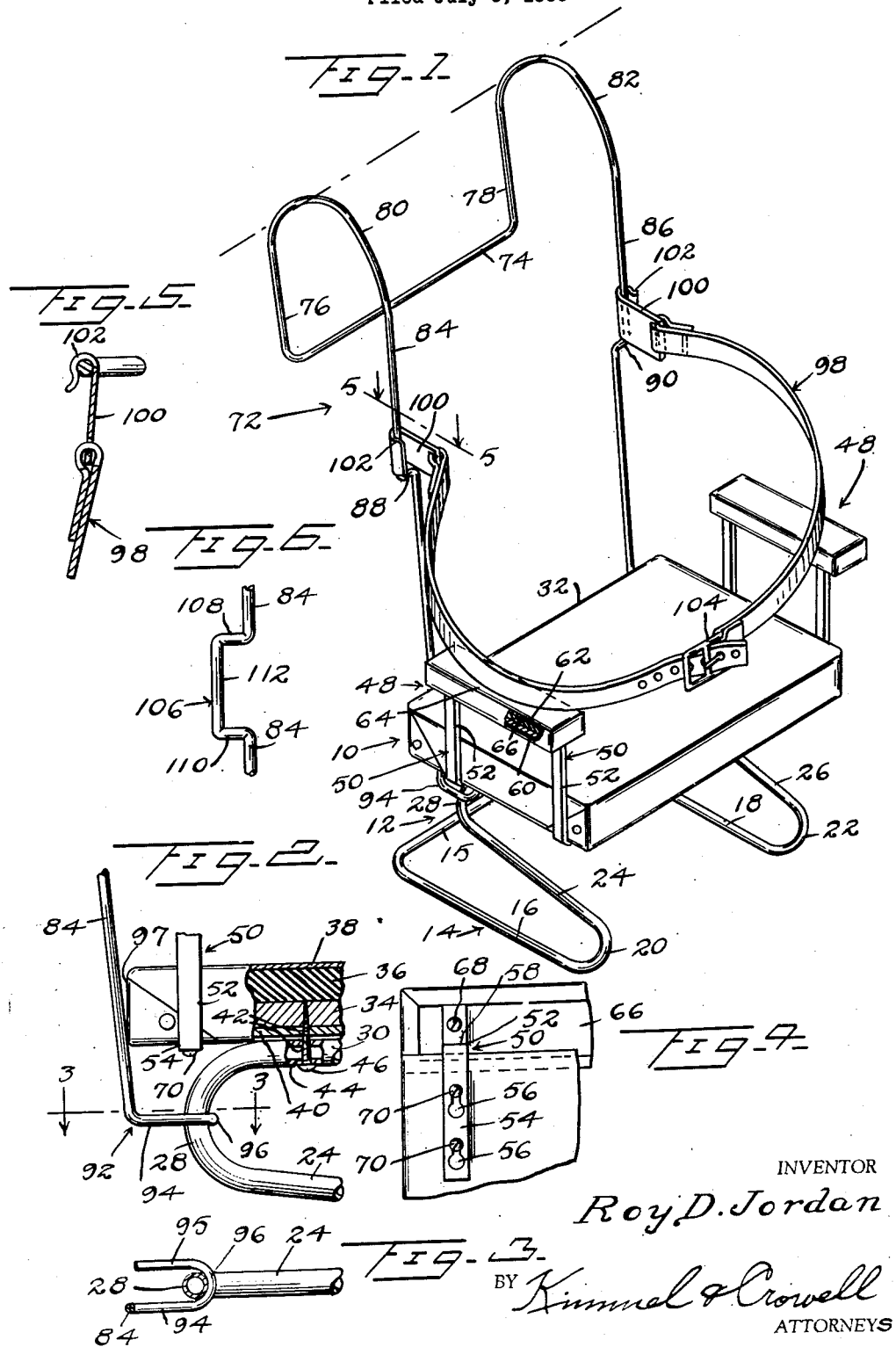
INVENTOR
Roy D. Jordan
BY Kimmel & Crowell
ATTORNEYS

United States Patent Office 2,799,322
Patented July 16, 1957

2,799,322
CHILD'S SAFETY SEAT
Roy D. Jordan, Cullman, Ala.

Application July 5, 1955, Serial No. 519,732

2 Claims. (Cl. 155—11)

This invention relates to safety devices or attachments for automobiles and other types of vehicles, and more specifically, this invention pertains to a child's safety seat attachment.

One of the primary objects of this invention is to provide a child's safety seat for an automobile having cushioned front and rear seats and backs therefor, the safety seat being supported on one of the cushions and connected to its associated back by means of a rack which includes a connecting loose linkage.

A further object of this invention is to provide a child's safety seat for an automobile of the type referred to supra, together with a safety belt connected with the rack and spanning the upper torso of the child, the belt serving to direct the force of inertia generated by a sudden stop downwardly instead of forwardly thereby precluding physical injury to the child through the avoidance of contact with the dashboard or the back of the front seat.

Another object of this invention is to provide in a child's safety seat of the type to which reference has been made above, means for preventing inadvertent or accidental vertical displacement of the safety belt.

It is a still further object of this invention to provide a rack for connecting the safety seat with the back of an automobile seat, the rack being formed of resilient material and of such construction as to clamp the back of the seat therein.

This invention has, as a further object thereof, the provision of a child's safety seat wherein the rack and frame thereof are rounded and the lost motion connection therebetween coact to prevent the marking, cutting, creasing or undue wear on the automobile seat and its associated back.

The present invention also contemplates the provision of a substantially sinusoidal supporting frame for the safety seat to achieve, simultaneously, a light weight supporting structure which is aesthetic and capable of supporting heavy loads.

It is a further object of this invention to provide detachable connector means between the safety seat and the rack whereby the seat may be removed from the rack without the use of tools. The disconnected seat may be utilized when taking the child to a theater or restaurant, for example, and placed upon the conventional adult chairs or seats to provide ample elevation of the child while eating or viewing the theater screen.

It is a still further object of this invention to construct a child's safety seat of a minimum number of parts.

It is also within the purview of this invention to provide a child's safety seat with detachable arm rests.

Still another object of this invention is to provide a child's safety seat of the type described above which is inexpensive to manufacture, non-complex in construction and assembly, and durable in use.

Other and further objects of this invention will become more apparent from the following specification when read in conjunction with the annexed drawings, in which:

Figure 1 is a perspective view of a child's safety seat constructed in accordance with this invention.

Figure 2 is an enlarged fragmentary partial side elevational view of the seat shown in Figure 1, illustrating the details of the connection between the rack and the seat frame.

Figure 3 is an enlarged fragmentary detail cross-sectional view taken on the horizontal plane of line 3—3 of Figure 2, looking in the direction of the arrows.

Figure 4 is an enlarged fragmentary bottom plan view illustrating the details of the detachable connections between the arm rests and the seat.

Figure 5 is an enlarged detail fragmentary cross-sectional view taken on the horizontal plane of line 5—5 of Figure 1, looking in the direction of the arrows.

Figure 6 is an enlarged fragmentary detail front elevational view of a modified form of the belt receiving brackets.

Referring now more specifically to the drawings, reference numeral 10 designates, in general, a child's safety seat constructed in accordance with the teachings of this invention. As illustrated therein the seat 10 is seen to comprise a metallic hollow tubular seat supporting frame 12 which includes a substantially U-shaped base 14 having a bight portion 15 and spaced, substantially parallel arm sections 16, 18 projecting laterally away therefrom at each of its ends, respectively, and in the same direction. The outer ends of the arms 16, 18 are arcuately reverted at 20, 22 and have rearward and upward extending bars 24, 26, respectively, integrally formed therewith.

The upper ends of the bars 24, 26 are integrally reverted at 28, the bar 24 being the only one of which is illustrated herein. A normally horizontal pair of seat supporting arms 30 are integrally formed with the bars 24, 26 in overlying relation thereto. It will be observed that when the seat or chair 10 is unoccupied the seat supporting arms 30 are substantially parallel to the arm sections 16, 18 of the base 14.

The above described tubular frame 12 is seen to be substantially sinusoidal in side elevation.

The seat, designated generally by the reference numeral 32, is seen to comprise a substantially rectangular plywood base 34 on which is mounted and secured, by conventional means, a substantially rectangular pad or cushion 36 formed of resilient material such as, for example, foam rubber.

A seat cover 38 formed of nylon, or any other suitable plastic material, overlies the upper side of the cushion 36 and extends downwardly across the outer sides of the cushion 36 and base 34, and the cover 38 is then lapped over the exposed side of the base 34 and is secured thereto by any conventional means. The exposed portion of the base 34 and the overlapped ends thereof are covered by a substantially rectangular trim piece 40 formed of heavy cardboard or other substantially stiff material. The trim piece 40 is also secured to the base 34 by any conventional means.

As is seen in the drawings, the arms 30 are each provided with a pair of diametrically opposed openings 42, 44 intermediate the ends thereof and which receive therethrough screws 46.

A detachable arm rest for each side of the seat 10 is generally indicated by the reference numeral 48. The arm rests 48 are seen to comprise a pair of angle members 50 having a substantially rectangular central body portion 52 having a flange 54 projecting laterally away therefrom at one of its ends. The flanges 54 are each provided with keyhole slots 56 to serve a function to be described below. The angle members 50 are each bent at their opposite ends to provide laterally extending flanges 58 which project laterally away from the central body portion 52 in a direction opposite to the direction of the extension of the flanges 54.

An elongated substantially rectangular plywood base 60 has secured to a side thereof an elongated substantially rectangular cushion or pad 62 formed of foam rubber, or other suitable resilient materials. A cover member 64 extends over the exposed side of the cushion 62 and downwardly along its sides and the sides of the base 60 and is then lapped across the marginal edges adjacent the sides of the base 60 and secured thereto by conventional means. An elongated substantially rectangular trim piece 66 extends across the exposed side of the base 60 and a portion of the overlapping ends of the cover member 64.

Each end of the base 60 is fixedly secured to a pair of flanges 58 by means of screws 68.

A plurality of headed screws 70 are connected to the base 34 at spaced intervals and depend therefrom. The screws 70 are adapted to be received within the keyhole slots 56 to detachably connect the arm rests with the seat 10. If desired, however, the screws 70 could be tightened to rigidly connect the arm rests with the seat 10.

A rack, indicated in general by the reference numeral 72, includes a single length of metallic rod bent to form a normally horizontal central body member 74 having the ends thereof laterally and upwardly bent to form a pair of spaced substantially parallel arms 76, 78 which, at their respective upper ends, are integrally connected with one end of a pair of arcuately shaped elements 80, 82. The other ends of the arcuately shaped elements 80, 82 are integrally connected with the upper ends of a pair of downwardly extending arms 84, 86 having laterally and inwardly extending shoulders 88, 90, respectively, formed therein intermediate their respective ends. The lowermost ends of the arms 84, 86 terminate in horizontal and forwardly projecting U-shaped hook members 92 having a pair of opposed spaced and substantially parallel side members 94, 95 integrally connected at one of their respective adjacent ends by the bight portion 96. As is seen in Figure 3, the hook members 94, 95 engage loosely about the arcuate elements 28 when the rack 72 is connected to the frame 14, and the bights 96 slidably engage the arcuate elements 28 as the arm sections 16, 18, the supporting arms 30, and the bars 24, 26 are flexed toward and away from each other. With the rack and frame in their respective operative positions, the inner longitudinal side 97 of the seat 10 engages against the arms 84, 86 and thereby detachably locks the arcuate sections 28 within the hooks 92 to prevent inadvertent or accidental disconnection therebetween. To achieve this "floating" type of connection it is essential that the side frame members be sinusoidal in configuration.

A belt 98 has a snap fastener bracket 100 fixedly secured to each end thereof with each of the brackets 100 terminating in snap fasteners 102 which are adapted to partially surround the respective arms 84, 86 above the shoulders 88, 90, which limit the downward movement of the brackets 100. The belt 98 is provided with any conventional type of length adjusting means, such as the buckle 104.

If desired, the arms 84, 86 may be formed with confronting C-shaped belt receiving brackets 106 instead of the offset shoulders 88, 90. The C-shaped brackets 106, illustrated in Figure 5, includes a pair of laterally offset shoulders 108, 110 having their respective outer ends integrally connected by a bight 112 around which is clamped the snap fasteners 102.

The above described safety seat is especially designed for the use of children from about two to eight years of age in order to make it easier for them to see outside of the vehicle as well as to serve as a safety device. In utilization, the rack 72 is slipped over the upper end of the back of a car seat, and the arms 76, 78, and 84, 86, which downwardly converge towards each other, respectively, are flexibly clamped thereto. The base 14 rests on the seat cushion (not shown) and is connected with the U-shaped hooks 92 at each side thereof in the manner illustrated in Figures 1, 2 and 3.

The child is strapped into the seat by means of the belt 98, the belt passing slightly below the shoulders and spanning the chest or upper torso. The proper tension of the belt is obtained, of course, through the adjustment means 104. The shoulders 88, 90 prevent the belt from slipping downwardly across the child so that it engages across the abdomen instead of the chest.

This feature of the invention is most important inasmuch as a child so strapped will not pitch forward when the automobile is brought to a sudden stop since the force of inertia is directed downwardly instead of forwardly as the usual case.

It is obvious that once the belt adjustment has been properly made further adjustment thereof is rendered unnecessary since the brackets 100 may be detached from the arms 84, 86.

To disconnect the chair 10 from the rack 72, it is only necessary that the frame 14 be rotated substantially 90° to present the bars 24, 26 to the bight 96 at which time the hooks 92 may be withdrawn therefrom. Upon the disconnection of the seat from the rack, the seat may be taken into a restaurant, theater, or other types of edifices wherein the height of the child's seat is an important factor.

A seat so constructed as described and illustrated herein is aesthetic in appearance and may be used in practically any room of the household. Additionally the S-shaped frame represents a substantially rigid though flexible support for the seat and is designed to support adults of average weights, the seat in these instances being treated in substantially the same manner as a footrest or hassock.

Having described and illustrated one embodiment of this invention in detail, it will be understood that the same is offered merely by way of example, and that the invention is to be limited only by the scope of the appended claims.

What is claimed is:

1. A child's safety seat for a vehicle having a seat and back therefor, said safety seat comprising a back supported rack having a pair of laterally spaced downwardly extending substantially parallel arms, the free ends of said arms terminating in laterally extending and forwardly projecting hooks, a frame including a substantially U-shaped base having opposed spaced and substantially parallel arm sections and an integrally connecting bight at one of the respective adjacent ends of said arm sections, said arm sections being integrally connected with one end of a pair of arcuately shaped elements, the other ends of said arcuately shaped elements being integrally connected on one of the ends of a pair of bars positioned above said arm sections and being substantially parallel thereto, said bars having their respective other ends integrally connected with one of the ends of a second pair of arcuately shaped members, the other ends of said second pair of arcuately shaped members being integrally connected with one of the ends of a pair of elongated arms, said elongated arms being vertically spaced from said bars, a seat for said frame, said seat comprising an elongated substantially rectangular base member having an elongated substantially rectangular flexible cushion fixedly secured thereto, a cover for said cushion extending around the sides thereof and the sides of said base member, said cover overlapping portions of said base member adjacent the marginal edges thereof, means fixedly securing said cover to said base member, a trim sheet extending across the exposed side of said base member and adjacent portions of said cover, means fixedly securing said trim sheet to said base member, single fastening means extending through said elongated arms and penetrating said base member for fixedly securing said seat to said frame, said hooks engaging and partially surrounding said arcuately shaped portions disposed intermediate said bars and said elongated arms and being loosely engaged therewith, and said seat having a longitudinally extending side thereof engaging against said first named arms.

2. A child's safety seat as defined in claim 1, and an arm rest detachably secured to the opposed ends of said seat.

References Cited in the file of this patent
UNITED STATES PATENTS

| | | |
|---|---|---|
| 2,446,036 | Zdanaitis et al. | July 27, 1948 |
| 2,581,279 | Muri | Jan. 1, 1952 |
| 2,664,140 | Kindleberger | Dec. 29, 1953 |
| 2,679,282 | Anderegg | May 25, 1954 |